(12) United States Patent
McKay

(10) Patent No.: US 8,447,737 B2
(45) Date of Patent: May 21, 2013

(54) SYSTEM AND METHOD FOR VERSIONING OF CONFIGURATION ITEMS

(75) Inventor: Peter McKay, Brooklyn, NY (US)

(73) Assignee: CA, Inc., Islandia, NY (US)

( * ) Notice: Subject to any disclaimer, the term of this patent is extended or adjusted under 35 U.S.C. 154(b) by 423 days.

(21) Appl. No.: 12/549,829

(22) Filed: Aug. 28, 2009

(65) Prior Publication Data

US 2011/0055165 A1    Mar. 3, 2011

(51) Int. Cl.
*G06F 7/10*   (2006.01)
*G06F 17/30*  (2006.01)

(52) U.S. Cl.
USPC ............................................. 707/682

(58) Field of Classification Search
USPC ............... 707/638, 709, 999.202; 717/121
See application file for complete search history.

(56) References Cited

U.S. PATENT DOCUMENTS

| 7,761,851 | B2 * | 7/2010 | Bailey et al. | 717/121 |
| 2008/0162590 | A1 * | 7/2008 | Kundu et al. | 707/202 |
| 2010/0114825 | A1 * | 5/2010 | Siddegowda | 707/638 |
| 2010/0114861 | A1 * | 5/2010 | Xiao et al. | 707/709 |

\* cited by examiner

*Primary Examiner* — Sathyanarayan Pannala
(74) *Attorney, Agent, or Firm* — Pillsbury Winthrop Shaw Pittman LLP

(57) ABSTRACT

A system and method for reconstructing a previous state of a configuration item based on information regarding changes to one or more values of one or more attributes associated with the configuration item.

21 Claims, 4 Drawing Sheets

US 8,447,737 B2

SYSTEM AND METHOD FOR VERSIONING OF CONFIGURATION ITEMS

FIELD OF THE INVENTION

The invention relates to the field of configuration management. More particularly, the invention relates to managing changes to configuration items in a configuration management system.

BACKGROUND OF THE INVENTION

Typically, configuration management products take multiple snapshots to track changes to multiple configuration items ("CIs"). Over time, these multiple snapshots require large amounts of disk space because they store information regarding every attribute associated with a configuration item regardless of whether a particular attribute was changed or not.

The snapshots are usually taken during pre-determined intervals, for example, once a month. Thus, a particular snapshot may not account for changes that occur between each interval.

These and other drawbacks exist.

SUMMARY OF THE INVENTION

In some implementations, the invention relates to a system and method for creating/reconstructing one or more previous states of a configuration item ("CI"). A configuration item may be an object/resource which is being managed (or is to be managed) in an enterprise. A configuration item may represent various types of objects/resources which may include, but not be limited to, hardware, software, services, users, business units, service level agreements, organizations, and/or other objects/resources associated with the enterprise.

A configuration item may have one or more attributes associated with it. All the attributes of a CI with their associated values define a complete state of a CI at a given point in time. The values of these attributes may change over time and these changes may be tracked by a configuration management system. Information regarding the configuration items, which may include, but not be limited to, information regarding the attributes associated with the configuration items and relationships between CIs may be stored in a database. According to one aspect of the invention, the database may comprise a configuration management database (CMDB), though the implementation of this invention is not limited to a specific type of database as long as the database stores the information regarding configuration items.

A configuration management system may comprise, among other things, at least one configuration management server that is configured to receive configuration data from one or more configuration items that it manages.

In some implementations, a configuration item managing module may comprise one or more sub-modules which may include, but not be limited to, a configuration data analysis module, a configuration item (CI) state determination/creation module, a search/presentation module, and/or other sub-modules.

Configuration data analysis module may receive configuration data from one or more configuration items. The configuration data may include data regarding one or more attributes associated with the configuration items. The configuration data analysis module may, based on the received configuration data, determine whether a change has occurred to the configuration item. In response to a determination that a change has occurred, the configuration data analysis module may send change information to a recording module. The change information may include one or more attributes whose values have changed, the associated changed values, and/or other change information.

The recording module may receive the change information and create a record for the configuration item, wherein the created record may store the received change information. The recording module may also store a date and time indicating when the record was created. The recording module may store the created record in a log of records. The log of records may thus store a complete history of all changes made to the configuration items and may represent an audit log. The configuration server may be communicatively coupled to a database where the log of records is maintained.

In some implementations, the CI state determination/creation module may create a previous state of a configuration item in response to a user request or otherwise. Based on the various changes stored in the log of records, the CI state determination/creation module may be able to reconstruct/synthesize/create a previous state of the configuration item at any point in time in the range represented by the log.

The CI state determination/creation module may determine a current state of the configuration item, wherein the current state of the configuration item may include one or more current values of one or more attributes associated with the configuration item. The CI state determination/creation module may retrieve one or more records associated with the configuration item from the log of records. The CI state determination/creation module may apply the changes from the one or more retrieved records to the one or more current values of the one or more attributes associated with the configuration item to reconstruct the previous state of the configuration item.

Various other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

Figure 1:
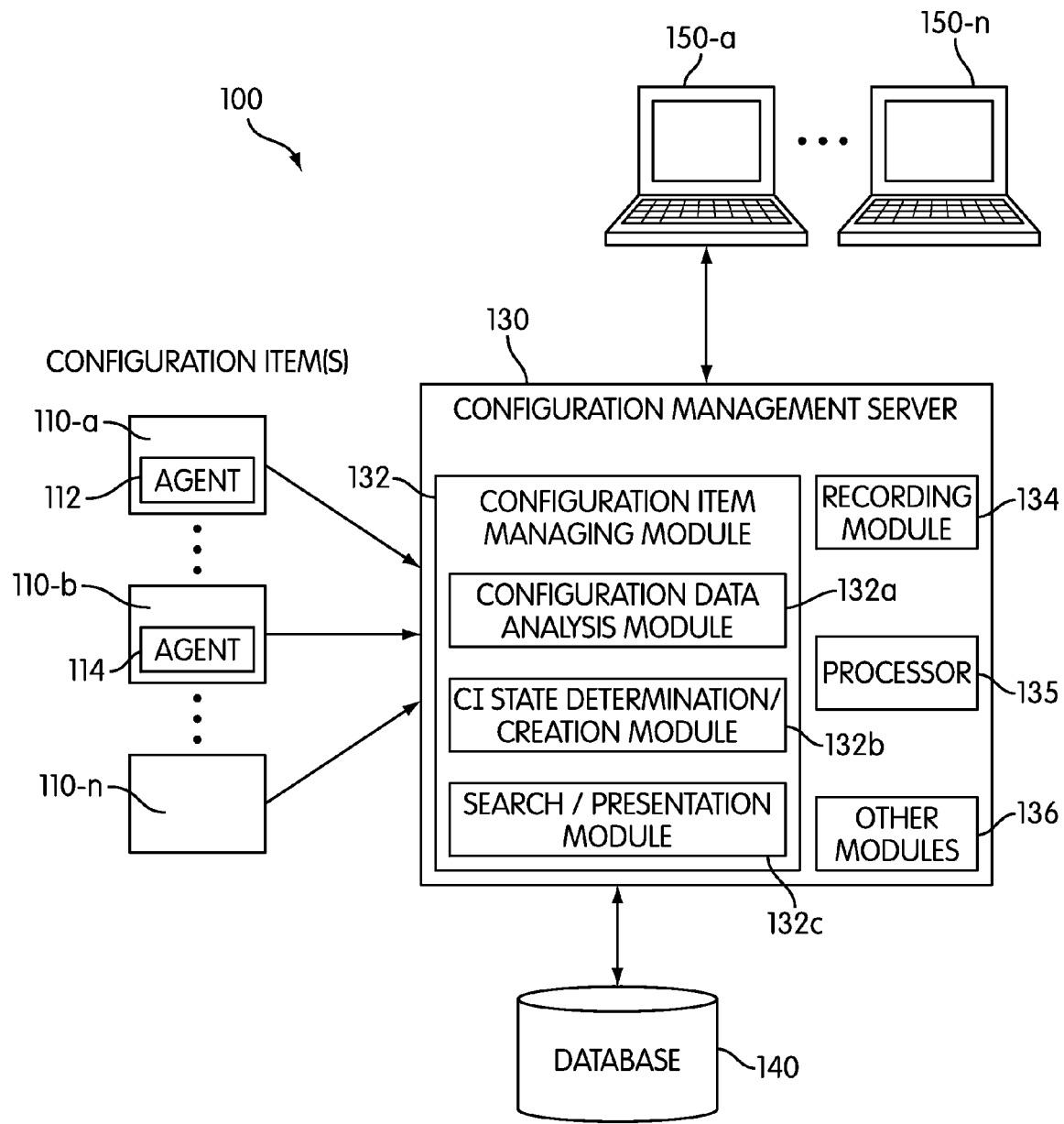
FIG. 1 is an illustration of an example configuration management system, according to various aspects of the invention.

FIG. 1 is an exemplary illustration of a configuration management system 100, according to, an aspect of the invention. Configuration management system 100 may include, among other things, at least one configuration management server 130 that is configured to receive configuration data from one or more configuration items 110-*a*, 110-*b*, . . . , 110-*n* that it manages. Configuration management server 130 may include a processor 135, circuitry and/or other hardware operable to execute computer-readable instructions. According to one aspect of the invention, the configuration management system 100 may include one or more tangible computer-readable storage media configured to store one or more software modules, wherein the software modules include computer-readable instructions that when executed by the processor cause the processor to perform the functions described herein. According to one implementation, the configuration management server 130 may comprise computer hardware programmed with a computer application having one or more software modules that enable the various features and functions of the invention. Non-limiting examples of the software modules in the application may include one or more of a configuration item managing module 132, a recording module 134, and/or other modules 136 for performing the features and functions described herein.

A configuration item ("CI") 110-a, 110-b, ..., 110-n may have one or more attributes associated with it. All the attributes of a CI with their associated values define a complete state of a CI at a given point in time. The attributes of a CI may include, but not be limited to, type of configuration item, install date, license information, location, name, manufacturer, release information, MAC address, IP address, status, vendor information, component information, acquire date, category, model name, lease information, relationship with other CIs, and/or other attributes that define the configuration item. For example, attributes associated with a server CI may include component attributes such as disk space, memory, processor type, and/or other attributes. Relationship attributes may define directional relationships between CIs. Relationship attributes may define various relationship types, for example, provider to dependent, dependent to provider, peer-to-peer, and/or other relationship types. Relationships between CIs may include, is approved by, is authorized by, is owned by, connects to, is contained by, is controlled by, is hosted by, is used by, monitors, and/or other relationships.

Configuration management system 100 may track various changes to the configuration items 110-a, 110-b, ..., 110-n. In other words, for each configuration item that the configuration management system 100 manages, any change to a value of one or more attributes associated with the configuration item is tracked. Configuration management system 100 tracks who or what made the change and when, and also provides a record of how these changes affect CI relationships. Configuration item records may be created to record the values of the attributes and/or changes to the values. This information may then be utilized to reconstruct a previous state of a configuration item at any given point in time. Configuration item records may record/store information regarding the attributes associated with the configuration items including the relationships between CIs. According to one aspect of the invention, configuration management server 130 may be communicatively coupled to a database 140 that may store/maintain a log of records which may include configuration item records associated with the one or more configuration items. According to one aspect of the invention, the log of records may represent an audit log and the configuration item records may represent configuration item audit log records associated with the one or more configuration items. The database may comprise a CMDB, though the implementation of this invention is not limited to a specific type of database as long as the database stores the information regarding configuration items.

Administrators (or other users) may interact with the configuration management server 130 via one or more client devices 150-a, ..., 150-n. Client devices 150-a, ..., 150-n may each comprise a user interface module (not shown) that may enable users to perform various operations that may facilitate interaction with configuration management server 130 including, for example, managing/accessing configuration item records, providing requests for one or more states of configuration items, receiving/providing information (for example, configuration related information or other information) associated with configuration items, and/or performing other operations. Client devices 150-a, ..., 150-n may include a processor (not shown), circuitry, and/or other hardware operable to execute computer-readable instructions.

According to one implementation, configuration item managing module 132 may comprise one or more sub-modules which may include, but not be limited to, configuration data analysis module 132a, configuration item ("CI") state determination/creation module 132b, search/presentation module 132c, and/or other sub-modules. Configuration data analysis module 132a may receive configuration data from one or more configuration items 110-a, 110-b, ..., 110-n. The configuration data may include data regarding one or more attributes associated with the configuration items. A configuration item may run a discovery agent 112, 114 that discovers/gathers the appropriate configuration data and sends the gathered data to configuration data analysis module 132a. The attributes of the configuration item which are to be tracked and for which data is to be gathered may be pre-determined, for example, determined at design time. Discovery agent 112, 114 may accordingly send configuration data regarding the pre-determined attributes. While FIG. 1 depicts discovery agents running on the configuration items 110-a and 110-b, one of ordinary skill in the art would recognize that discovery tools may be run on the configuration management server, and in some cases be run in a distributed fashion on the configuration item and the configuration management server.

In some cases, the configuration item may be of a type where a discovery agent cannot be run, for example, a service level agreement CI. In these cases, configuration data analysis module 132a may receive data associated with the attributes of such a CI from an administrator and/or other user of the configuration management system 100 via, for example, client devices 150-a, ..., 150-n. Configuration data analysis module 132a may track a login id of the user from whom the data was received along with a date and time of when it was received.

The configuration data analysis module 132a may analyze the received configuration data to determine whether a change has occurred to the configuration item. In other words, configuration data analysis module 132a may determine whether a particular value of an attribute associated with the configuration item has changed. Configuration data analysis module 132a may compare a most recent configuration item record associated with the configuration item with the received configuration data to determine if there is a change. For example, the discovery agent may send value 100 GB for the disk space attribute of a server CI. If the most recent configuration item record indicates that the value of the disk space attribute was 50 GB, configuration data analysis module 132a may determine that the value of the disk space attribute for the server CI has changed. In one implementation, configuration data analysis module 132a may perform an attribute level comparison to determine whether a change has occurred. Configuration data analysis module 132a may retrieve the most recent configuration item record associated with the configuration item from database 140. Configuration data analysis module 132a may retrieve the configuration item record based on any attribute associated with the configuration item that may uniquely identify the configuration item and thus the configuration item record in the database, for example, name attribute for the server CI (which may be referred to as a configuration item identifier).

Configuration data analysis module 132a may thus determine one or more changes to one or more values of one or more the attributes associated with a particular configuration item. In response to a determination that a change has occurred to the configuration item, configuration data analysis module 132a may send the change information to recording module 134. The change information may include at least a configuration item identifier attribute, information regarding one or more attributes whose values have changed, and the changed values.

In cases where configuration data from a new configuration item is received for a first time, configuration data analysis module 132a may determine that no configuration item record exists for the particular new configuration item. In such cases, configuration data analysis module 132a may send information regarding all the attributes and the associated values to the recording module 134.

Recording module 134 may create configuration item records associated with a configuration item based on the received information. Configuration item records associated with a configuration item may record/store at least information associated with one or more attributes of the configuration item including the CI identifier, the values of the attributes including the changed values, date and/or time information, and/or other information. Attributes of the configuration item may represent fields of the configuration item records and the values of the attributes may be stored as values of the fields.

In some implementations, information regarding a new configuration item may be received and recording module 134 may create a new configuration item record for the new configuration item. The new configuration item record may store the one or more attributes of the new configuration item and the associated values. The new configuration item record may include a date and time field that may store when the new configuration item record was created.

In some implementations, information regarding changes to a configuration item may be received and recording module 134 may create a new version of an existing configuration item record associated with the configuration item. The new version of the existing configuration item record may store only the changes to the configuration item. In other words, only the attributes that have changed and the associated changed values may be stored in the new version of the existing configuration item record. As and when changes are determined and sent to recording module 134 for an existing configuration item record, one or more versions of the existing configuration item record are created to record the changes. The versions may be linked via a unique identifier field, for example, configuration item identifier. Every version of an existing configuration item record may include a date and time field that may store when the new version was created.

In some implementations, recording module 134 may create a new version of an existing configuration item record which may store all the attributes and their associated values, wherein attributes which have not changed may have the same values as the existing configuration item record and the attributes which have changed may have the changed values.

In some implementations, recording module 134 may record/store the before and after images of the attributes that have changed, for example, for comparison purposes.

Recording module 134 may store the created configuration item records/versions of configuration item records into database 140. According to one aspect of the invention, database 140 may include a change log database 310 and recording module 134 may store the created configuration item records/versions of configuration item records including the changes to the configuration item into the change log database 310 (shown in FIG. 3, for example).

Search/presentation module 132c may receive user requests (for example, search requests and/or other requests) for a particular previous state of a configuration item. The request may include one or more search parameters, for example, a configuration item identifier, a type/name of configuration item for which a previous state is desired, a date/time for which the previous state is desired, an attribute and/or value for which the previous state is desired, an attribute name, attribute value, and/or an instance of the attribute value for which the previous state is desired, and/or other search parameters. Search/presentation module 132c may send the search parameters to CI state determination/creation module 132b.

CI state determination/creation module 132b may search for and retrieve one or more configuration item records associated with the configuration item whose previous state is desired from database 140. According to an aspect of the invention, CI state determination/creation module 132b may retrieve the one or more configuration item records from change log database 310. CI state determination/creation module 132b may utilize the one or more of the search parameters to retrieve the records.

Figure 3:
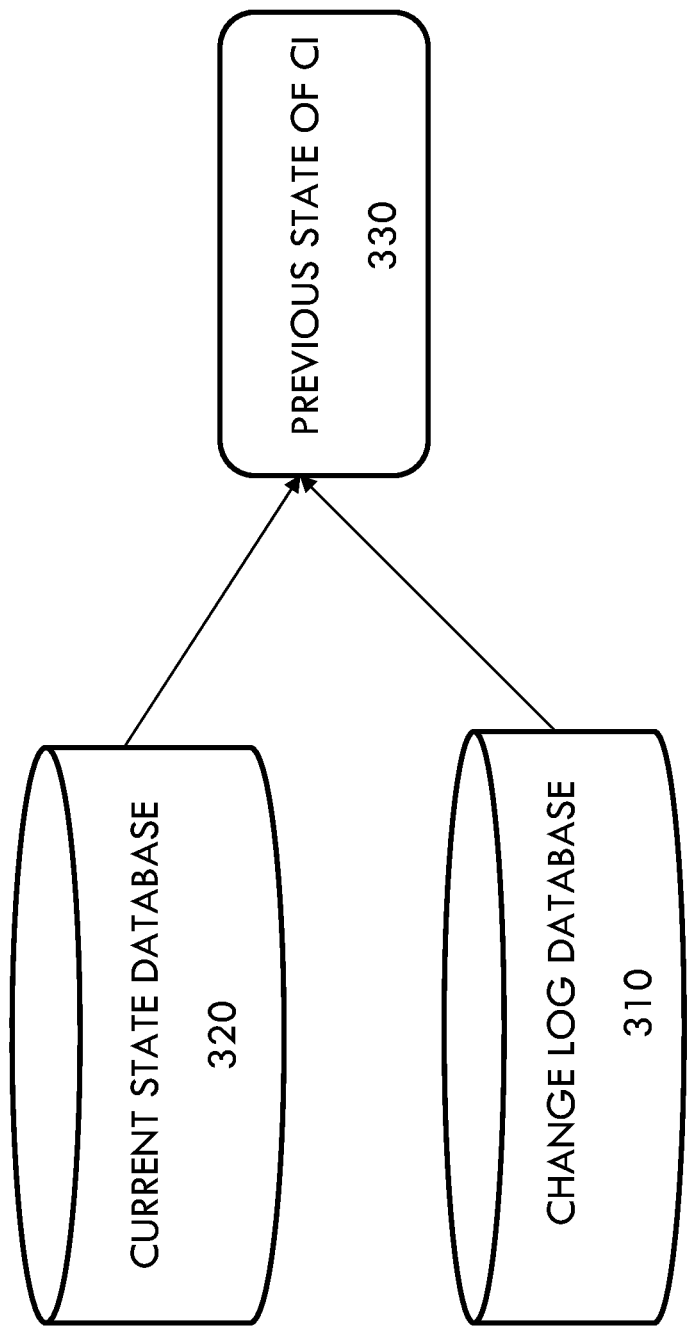
FIG. 3 is an illustration of example databases, wherein information stored therein is utilized to create a previous state of a configuration item, according to various aspects of the invention.

CI state determination/creation module 132b may determine a current state of the configuration item, wherein the one or more attributes of the configuration item with their current values define the current state of the configuration item. CI state determination/creation module 132b may determine the current state based on the most recent configuration item record retrieved from the database. According to an aspect of the invention, CI state determination/creation module 132b may send a configuration item identifier to configuration data analysis module 132a. Configuration data analysis module 132a may trigger a discovery agent to send current configuration data, and in addition to being recorded in the database 140 via for example, recording module 134, the change information determined by configuration data analysis module 132a may also provided to CI state determination/creation module 132b. CI state determination/creation module 132b may determine the current state based on the most recent configuration item record and/or the change information. According to one implementation, configuration data analysis module 132a may provide the change information to recording module 134 and provide the configuration data to CI state determination/creation module 132b. Based on the most recent configuration item record, the change information and/or the currently received configuration data, the CI state determination/creation module 132b may determine the current state of the configuration item. In some implementations, database 140 may include a current state database 320 and information associated with the current state of the configuration item may be stored in the current state database 320. The current state database 320 may be separate from the change log database 310, as shown in FIG. 3, for example.

CI state determination/creation module 132b may create a previous state of the configuration item based on the one or more retrieved configuration item records. The retrieved configuration item records may include one or more versions created for a configuration item record associated with the configuration item. The one or more versions provide an audit trail (i.e., complete history) regarding one or more changes made to the configuration item. As such, CI state determination/creation module 132b may identify a complete history of changes made to the configuration item. Starting from the current state, CI state determination/creation module 132b may apply the one or more changes to the current state of the configuration item to reconstruct the previous state of the configuration item. The attribute changes (which indicate prior changes to the values of the attributes associated with the configuration item) identified from the retrieved configuration item records (including versions of the configuration item records) may be applied to the current values of the attributes associated with the configuration item to reconstruct/create the previous state. According to one implementation, the changes may be sequentially applied. In some implementations, the changes may be applied once all the required records have been retrieved. In some implementations, the changes may be applied as and when the required records are retrieved. CI state determination/creation module 132b may reconstruct a previous state of the configuration item, wherein the one or more, attributes of the configuration item with their previous values at a given point in time define the previous state of the configuration item at that point in time. According to an implementation, CI state determination/creation module 132b may create a previous state 330 of the configuration item based on the one or more retrieved configuration item records retrieved from the change log database 310 and the current state information obtained from current state database 320, as shown in FIG. 3, for example.

According to an implementation, CI state determination/creation module 132b may create a previous state of the configuration item as it existed at particular previous date/time specified in the user request. CI state determination/creation module 132b may accordingly retrieve one or more configuration item records based on a value of a date attribute and a time attribute and/or date and timestamp associated with the configuration item. Since, the configuration item records/versions of configuration item records store the date and time when the records were created, CI state determination/creation module 132b may retrieve all records starting from a current date and time to the previous date and time specified in the request. By applying attribute changes identified from the retrieved configuration item records to the current values of the attributes associated with the configuration item, CI state determination/creation module 132b may reconstruct/create the previous state of the configuration item at the specified previous date/time.

For example, configuration item records associated with a server CI may include three records storing changes to the disk space attribute, wherein the first record may store a value of 50 MB for the disk space attribute and a date/time of 60 days ago, the second record may store a value of 100 MB for the disk space attribute and a date/time of 30 days ago, and third record may store a value of 200 MB for the disk space attribute and a date/time of 15 days ago. Also, the current value of the disk space attribute of the server CI may be 250 MB. Search presentation module 132c may receive a request specifying that a previous state of the server CI is desired as it existed a month ago. Search/presentation module 132c may send the search parameters associated with the request (e.g., CI identifier, date/time parameters, and/or other search parameters) to CI state determination/creation module 132b. CI state determination/creation module 132b may retrieve the second and third configuration item records and apply the changes to the value of 250 MB to arrive at the value 100 MB which is the value of the disk space attribute a month ago. CI state determination/creation module 132b may similarly apply changes to the current values of any of the attributes associated with the configuration item to arrive at the previous values of the attributes. It will be readily appreciated that there may be one or more attributes whose values may not have changed during this time and more than one attribute whose value may have changed during this time. As such, CI state determination/creation module 132b may create/reconstruct the previous state of the server CI as it existed a month ago, wherein the previous state may indicate the value of the disk space attribute as 100 MB.

According to an implementation, CI state determination/creation module 132b may create a previous state of the configuration item based on a particular attribute and/or associated value specified in the user request. This may be the case, for example, when the user cannot provide an exact date and time for a desired previous state in the user request. For example, a previous state of the configuration item may be desired when a particular attribute was changed to or had a specific value. CI state determination/creation module 132b may accordingly retrieve one or more configuration item records based on the value of the particular attribute associated with the configuration item. CI state determination/creation module 132b may retrieve all records starting from a current value to the previous value specified in the request. By applying attribute changes identified from the retrieved configuration item records to the current values of the attributes associated with the configuration item, CI state determination/creation module 132b may reconstruct/create the previous state of the configuration item as it existed when the particular attribute had the previous value.

Continuing with the previous server CI example, search presentation module 132c may receive a request specifying that a previous state of the server CI is desired as it existed when the disk space attribute was changed to or had the value 50 MB. Search/presentation module 132c may send the search parameters associated with the request (e.g., CI identifier, attribute and/or value parameters, and/or other search parameters) to CI state determination/creation module 132b. CI state determination/creation module 132b may retrieve the first, second, and third configuration item records and apply the changes to the value 250 MB to arrive at the value 50 MB which is the value of the disk space attribute specified in the request. CI state determination/creation module 132b may similarly apply changes to the current values of any of the attributes associated with the configuration item to arrive at the previous values of the attributes. It will be readily appreciated that there may be one or more attributes whose values may not have changed and more than one attribute whose value may have changed. As such, CI state determination/creation module 132b may create/reconstruct the previous state of the server CI as it existed when the disk space attribute was changed to or had the value 50 MB. As such, the previous state of the configuration item may be created even without knowledge of an exact date and time.

Figure 4:
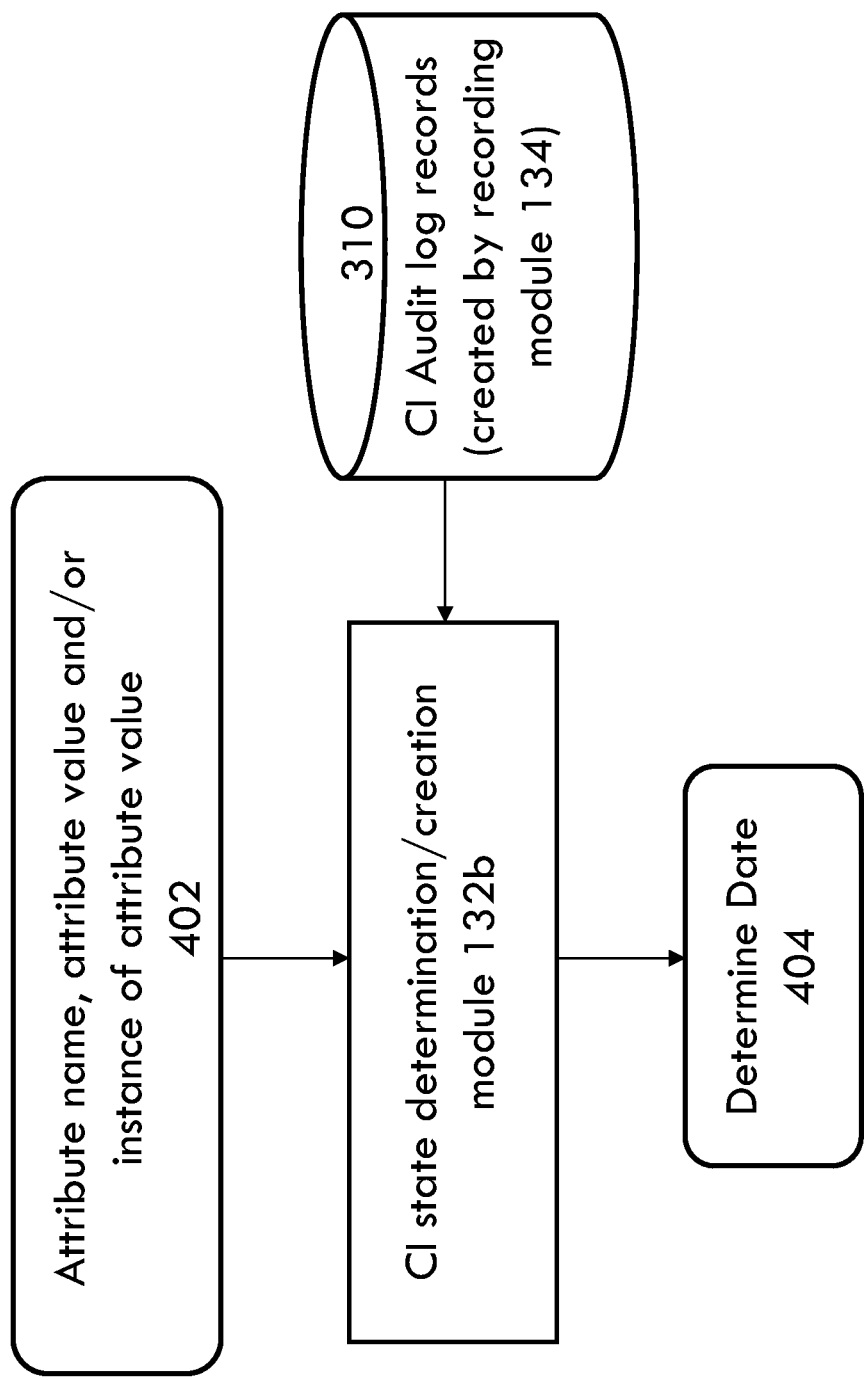
FIG. 4 is an illustration of example information/components/operations utilized to determine a date for a previous state of a configuration item, according to various aspects of the invention.

According to an implementation, CI state determination/creation module 132b may create a previous state of the configuration item based on a particular attribute name, attribute value, and/or an instance of the attribute value specified in the user request. This may be the case, for example, when the user cannot provide an exact date and time for the previous state in the user request. Search/presentation module 132c may receive the user request with one or more of the CI identifier, the particular attribute name, associated attribute value, an instance of the attribute value, and/or other parameters as search parameters and may send these search parameters to CI state determination/creation module 132b. For example, search/presentation module 132c may receive a request specifying that a previous state of the server CI named server 1 is desired as it existed when the disk space attribute was changed to or had the value 750 GB (due to an upgrade, for example). As shown in FIG. 4, CI state determination/creation module 132*b* may receive the search parameters 402 associated with the request and may search through the configuration item records/versions of configuration item records created by recording module 134 (and stored in change log database 310) to determine, for example, a date/time 404 when the value of the disk space attribute of server 1 was changed to or had the value 750 GB. As such, the date/time information may be determined by CI state determination/creation module 132*b* in cases where the exact data and time was not known and/or specified in the user request. In some cases, multiple instances of a same value for a particular attribute may exist in the configuration item records. For example, there may be more than one configuration item record for the server 1 CI where the disk space attribute may have the same value, i.e., 750 GB. This may be because the disk space of the server 1 CI may have changed multiple times, for example, where the disk space was increased to 750 GB, then decreased to 500 GB, then increased to 750 GB again, and so on and so forth. As such, the search parameters may also specify an instance of the attribute value. For example, the user request may specify that a previous state of the server 1 CI is desired as is existed when the disk space attribute was changed to or had the value 750 GB for the third time (i.e., the third instance of the value 750 GB). According to one implementation, the instance of the attribute value may also be stored as an attribute in a configuration item record associated with the configuration item. According to an aspect of the invention, the instance of the attribute value may be recorded in the configuration item record by recording module 134 or otherwise.

By utilizing one or more of the search parameters specified in the user request, the CI state determination/creation module 132*b* may search through the configuration item records to identify a configuration item record (for a particular configuration item whose previous state is desired) whose attributes, values, and/or instances of values match those specified in the user request. The date/time (i.e., previous date/time) associated with identified configuration item record may be determined, for example, based on the recorded date/time information in the configuration item record.

CI state determination/creation module 132*b* may accordingly retrieve one or more configuration item records based on the determined date/time information. Since, the configuration item records/versions of configuration item records store the date and time when the records were created, CI state determination/creation module 132*b* may retrieve all records starting from a current date and time to the determined date and time. By applying attribute changes identified from the retrieved configuration item records to the current values of the attributes associated with the configuration item, CI state determination/creation module 132*b* may reconstruct/create the previous state of the configuration item as it existed at the determined previous date/time. As such, the previous state of the configuration item may be created even without knowledge of an exact date and time.

One of ordinary skill in the art will recognize that the disk space attribute and associated values/instances of values used in the example above are exemplary and do not limit the scope of the invention. Various types of attributes/values may be used as search parameters to create one or more previous states of a configuration item. In some instances, more than one attribute/value may be specified as a search parameter. For example, for problem determination purposes, configuration item records may be automatically created when a problem ticket associated with a configuration item is opened or closed. By searching for "Problem Opened/problem number", where problem number is the number assigned to the problem ticket, CI state determination/creation module 132*b* may, for example, reconstruct the previous state of the configuration item when the problem ticket was opened.

A previous state of a CI may be reconstructed at a point in the range represented by the log of records. The log of records may be truncated when the size of the log becomes large or the information stored in the log gets outdated. The truncation may be performed based on the time since the last truncation, on the basis of file size of the log, and/or on the basis of a number of entries in the log. The previous state may be created by supplementing the log with the current state of the CI. Thus, even when the log may have no or partial information about an attribute, the previous state of the CI may still be accurately created. For example, based on knowledge of a current value of an attribute and a previous value of the attribute at a certain point in time, an estimated previous state of the CI at another point in time may be created.

Search/presentation module 132*c* may present the previous state of the configuration item in response to the user request. CI state determination/creation module 132*b* may communicate the previous state information, change history information, and/or other information to search/presentation module 132*c*. One or more users, via the user interface module, may provide the requests for a particular previous state of a configuration item and view the results provided by search/presentation module 132*c*. Search/presentation module 132*c* may present the previous state by providing a complete listing of all the attributes and the associated previous values of the configuration item at a given point in time. Search/presentation module 132*c* may present a complete history of the configuration item with a listing of the one or more changed values associated with one or more attributes of the configuration item (for example, starting with a current value of an attribute and listing each of the previously changed values of the attribute) such that a user may be able to view a complete audit trail for the configuration item and/or a particular attribute of the configuration item. Other mechanisms of presenting the results may be utilized without departing from the scope of the invention.

According to an aspect of the invention, a change to a configuration item may be a scheduled or pre-determined change. For example, the change may be associated with a change request which may include one or more requests for changes to attributes associated with the configuration item. For example, the change request may include a change order indicating that the disk space of a server CI is to be increased to 100 GB from 50 GB. The change request may identify multiple configuration items that require some level of change. The change request may be authorized by a person holding some level of authority over the change management process. Once authorized, an administrator (or other user), via client device 150, may record information associated with the change request in a configuration item record associated with the configuration item. According to an aspect of the invention, recording module 134 may receive the information associated with the change request and may create a new version of an existing configuration item record that may store the received information. The configuration item record may include a date and time field that may store when the new version was created. Information associated with the change request may be stored as appropriate attribute(s) and/or value(s) of the configuration item that will be affected by the change request. The information associated with the change request/change order may include, but not be limited to, the attributes that will be changed, the proposed changed values of the attributes, an identifier identifying the person who authorized the change, an identifier (e.g., login id) identifying the person who is recording the change, an identifier identifying the person who will be performing the change, when the scheduled change is to be performed (for example, start time/day and end time/day), a change number associated with the change request/change order, status of the change request/change order (e.g., opened, closed, etc.), and/or other information.

According to an aspect of the invention, the administrator may request the configuration data analysis module 132*a* to retrieve current configuration data associated with the configuration item that will be affected by the change request. The configuration item record created based in the current configuration data may provide a state of the configuration item before the change request was implemented. This information may be recorded with at least a portion of the change request information which may indicate or be used to provide, for example, a state of the CI when a change order was opened (when a change number was created). Once the change request is implemented and/or completed, the configuration data associated with the configuration item after the implementation of the change request may again be retrieved. The configuration item record created based on this configuration data may provide a state of the configuration item after the change request was implemented. This information may also be recorded with at least a portion of the change request information which may indicate or be used to provide, for example, a state of the CI when a change order was closed (when a change number was satisfied).

According to an aspect of the invention, once the change request is implemented/completed, an administrator (or other user), via client device 150, may also record completion information associated with the change request in a configuration item record associated with the configuration item. According to an aspect of the invention, recording module 134 may receive the completion information associated with the change request and may create a new version of an existing configuration item record that may store the received information. The configuration item record may include a date and time field that may store when the new version was created. The completion information associated with the change request/change order may include, but not be limited to, the attributes that were changed, the changed values of the attributes, an identifier (e.g., login id) identifying the person who is recording the change, an identifier identifying the person who performed the change, when the scheduled change was performed (for example, start time/day and end time/day), the change number associated with the change request/order, status of the change request/change order (e.g., opened, closed, etc.), and/or other information. The change to be made to the configuration item together with the reason for the change and the user who authorized/performed/recorded the change creates detailed configuration item records. This detailed information (i.e., in the form of attributes and/or values) stored in the configuration item records may be utilized at any later time (via for example CI state determination/creation module 132*b*) to reconstruct previous states of a configuration item. For example, any of the attributes and/or values in the configuration item records may be provided as search parameters to search for/retrieve configuration item records, retrieve complete history associated with the configuration item from the configuration item records, and/or create previous states of the configuration item based on the retrieved configuration item records. For example, the change number and/or status attributes may be provided as search parameters and CI state determination/creation module 132*b* may create a state of the CI, for example, when a particular change number associated with the change request was 'opened or closed.

In addition to determining/creating states of the configuration items, CI state determination/creation module 132*b* may perform a comparison of states of CIs to determine what changed between the times that the two states were determined/created. Search/presentation module 132*c* may receive a user request (for example, a compare request) to perform a comparison of at least two states of a CI. The compare request may include one or more parameters that may identify the two states, may identify the attributes and/or values that need to be compared, may be needed to create the states of the CIs (for example, similar to the search parameters provided in the search request), and/or other parameters. In some implementations, CI state determination/creation module 132*b* may create the two states of the CI that are to be compared. As such, CI state determination/creation module 132*b* may compare a current state with a created previous state. CI state determination/creation module 132*b* may compare two previous states that it may individually create using the process described above. CI state determination/creation module 132*b* may perform attribute level comparisons of the states of the CIs. For problem determination/correction purposes, for example, a current defective state of the CI may be compared with a previous state at any point in time in the past (for example, at a time when there were no problems) to identify potential problems. CI state determination/creation module 132*b* may, for example, compare the state of the configuration item before the change request was implemented and the state of the configuration item after the change request was implemented to ensure that the change that was to be made was actually made. In other words, CI state determination/creation module 132*b* may compare the state of the CI at the time a change number associated with the change request was opened to the state of the CI at the time the change number associated with the change request was closed to understand if the change was made properly, according to specification and if the desired results were achieved.

CI state determination/creation module 132*b* may compare a CI to another CI that acts as a standard. A standard CI may be defined as a standard configuration for a particular CI to which other operational CIs can be compared. Such a comparison may be made to ensure that the CI is in compliance and to help identify attributes that may need corrections.

According to an aspect of the invention, search/presentation module 132*c* may receive the user request to perform such a comparison which it may forward to CI state determination/creation module 132*b*. CI state determination/creation module 132*b* may perform the requested comparison and provide results to search/presentation module 132*c*. Search/presentation module 132*c* may accordingly present the results to the user. The results may provide an attribute level comparison result. In some cases, only the attributes with dissimilar values may be displayed.

A milestone may be an on-demand labeled state of a CI that may be created to mark an event, a logical breakpoint, or an accumulation of changes. Milestones may be recorded with a user-defined label, such as, for example, first day of production or January baseline, which may help for searching purposes. For example, search/presentation module 132*c* may facilitate searching for particular states identified by these labels.

Figure 2:
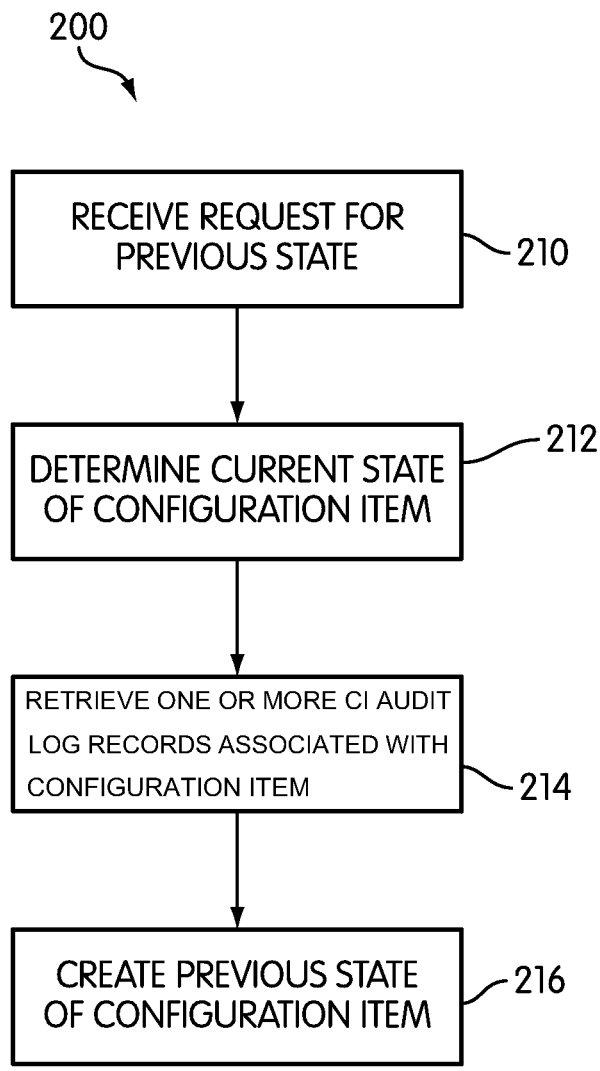
FIG. 2 is a flowchart depicting example operations performed by a configuration management system, according to various aspects of the invention.

FIG. 2 is an exemplary flowchart 200 depicting operations performed by a configuration management system, according to an aspect of the invention. The described operations may be accomplished using one or more of modules/sub-modules described herein and in some implementations, various operations may be performed in different sequences. In other implementations, additional operations may be performed along with some or all of the operations shown in FIG. 2. In yet other implementations, one or more operations may be performed simultaneously. In yet other implementations, one or more of operations may not be performed. Accordingly, the operations described are exemplary in nature and, as such, should not be viewed as limiting.

In operation 210, a user request for a previous state of a configuration item may be received. The user request may include one or more search parameters, for example, CI identifier, type/name of configuration item for which a previous state is desired, a date/time for which the previous state is desired, an attribute and/or value for which the previous state is desired, an attribute name, attribute value, and/or instance of the attribute value for which the previous state is desired. In response to the user request, a current state of the configuration item may be determined in operation 212. One or more configuration item audit log records associated with the configuration item may be retrieved from a log of records stored in database 140 in operation 214. In some implementations, the configuration item audit log records may be retrieved from change log database 310. The audit log records may be retrieved based on one or more of the search parameters specified in the user request. The one or more retrieved configuration item records may store one or more changes to one or more values of one or more attributes associated with the configuration item. The one or more changes in the retrieved records may be applied to one or more current values of the one or more attributes associated with the configuration item to reconstruct a previous state of the configuration item in operation 216.

In some implementations, data from multiple disparate data sources (such as service desk log, asset management log, and/or other logs) may be combined together in the log of records. The disparate data sources may provide additional attributes which when merged or combined with the configuration item records may provide a more complete state of a CI. The data from the disparate data sources may be converted into a common log format which may then be leveraged to supplement the data already stored in database 140 with additional data stored in the other disparate data sources. Once the data is in this format, the data may be used to create previous states of the CI at any point in the merged logs.

While various features of the invention have been described with respect to creating one or more previous states of a configuration item, it will be understood that the features described herein may apply to creating one or more future states of a configuration item. Configuration item records may be created for changes which are scheduled in the future, thereby allowing a user to see what a CI may look like at a future date.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention, and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for creating a previous state of a configuration item, the method executed by one or more processors configured to perform a plurality of operations, the operations comprising:
   receiving a user request for a previous state of a configuration item, wherein the user request includes one or more search parameters, the one or more search parameters including one or more of:
      a previous date and time, or
      a particular value for a particular attribute of the configuration item;
   determining a current state of the configuration item in response to the user request, wherein the current state of the configuration item includes one or more current values of one or more attributes associated with the configuration item;
   retrieving one or more records associated with the configuration item from a log of records based on the one or more search parameters in the user request,
      wherein the log of records comprises a plurality of records associated with a plurality of configuration items,
      wherein the one or more retrieved records of the plurality of records associated with the configuration item store one or more changes to one or more values of the one or more attributes associated with the configuration item,
      wherein retrieving the one or more records associated with the configuration item is based on one or more of a value of a date and time attribute associated with the configuration item or the particular value of the particular attribute associated with the configuration item, and
      wherein the one or more retrieved records include one or more of:
         records storing changes from between a current date and time and the previous date and time of the user request, or
         records storing changes between a current value of the particular attribute and the particular value in the user request; and
   creating a previous state of the configuration item based on the one or more retrieved records by applying the one or more changes from the one or more retrieved records to the one or more current values of the one or more attributes associated with the configuration item to provide one or more previous values of the one or more attributes associated with the configuration item.

2. The computer-implemented method of claim 1, the operations further comprising:
   receiving configuration data associated with the configuration item;

analyzing the received configuration data to determine whether a change has occurred to the one or more values of the one or more attributes associated with the configuration item;

creating a record for the configuration item, wherein the created record stores the determined change;

storing the created record for the configuration item in the log of records, wherein the created record is included in the one or more retrieved records associated with the configuration item.

3. The computer-implemented method of claim 2, wherein the configuration data associated with the configuration item is received from a discovery agent running on the configuration item.

4. The computer-implemented method of claim 1, wherein the one or more search parameters include at least a particular attribute, and a value for the particular attribute, the operations further comprising:

searching the plurality of records to determine a date and time when the particular attribute had the value included in the one or more search parameters; and retrieving the one or more records associated with the configuration item based on a value of a date attribute and a time attribute associated with the configuration item, wherein the one or more retrieved records include records starting from a current date and time to the previous date and time determined by the search.

5. The computer-implemented method of claim 1, wherein the user request further comprises a compare request for a comparison between at least two states of the configuration item, wherein a first state of the at least two states is the current state of the configuration item and a second state of the at least two states is the previous state of the configuration item, and wherein the operations further comprise:

comparing the one or more current values of the one or more attributes associated with the configuration item with the one or more previous values of the one or more attributes associated with the configuration item.

6. The computer-implemented method of claim 1, wherein the user request further comprises a compare request for a comparison between at least two states of the configuration item, wherein a first state of the at least two states is a first previous state of the configuration item and a second state of the at least two states is a second previous state of the configuration item, and wherein the operations further comprise:

retrieving one or more records associated with the configuration item from the log of records based on the one or more search parameters associated with the first previous state, wherein the one or more retrieved records store one or more first changes to one or more values of the one or more attributes associated with the configuration item; and creating a first previous state of the configuration item based on the one or more retrieved records by applying the one or more first changes from the one or more retrieved records to the one or more current values of the one or more attributes associated with the configuration item to provide one or more first previous values of the one or more attributes associated with the configuration item;

retrieving one or more records associated with the configuration item from the log of records based on the one or more search parameters associated with the second previous state, wherein the one or more retrieved records store one or more second changes to one or more values of the one or more attributes associated with the configuration item;

creating a second previous state of the configuration item based on the one or more retrieved records by applying the one or more second changes from the one or more retrieved records to the one or more current values of the one or more attributes associated with the configuration item to provide one or more second previous values of the one or more attributes associated with the configuration item; and comparing the one or more first previous values of the one or more attributes associated with the configuration item with the one or more second previous values of the one or more attributes associated with the configuration item.

7. A non-transitory, tangible computer-readable storage medium having one or more computer-readable instructions thereon which when executed by one or more processors cause the one or more processors to:

determine a current state of a configuration item in response to a user request, wherein the current state of the configuration item includes one or more current values of one or more attributes associated with the configuration item, and wherein the user request includes one or more search parameters, the one or more search parameters including one or more of:

a previous date and time, or a particular value for a particular attribute;

retrieve one or more records associated with the configuration item from a log of records based on the one or more search parameters in the user request, wherein the log of records comprises a plurality of records associated with one or more configuration items, wherein the one or more retrieved records of the plurality of records associated with the configuration item store one or more changes to one or more values of the one or more attributes associated with the configuration item, wherein retrieval of the one or more records associated with the configuration item is based on one or more of a value of a date and time attribute associated with the configuration item or the particular value of the particular attribute associated with the configuration item, and wherein the one or more retrieved records include one or more of:

records storing changes from between a current date and time and the previous date and time of the user request, or records storing changes from between a current value of the particular attribute and the particular value in the user request; and create a previous state of the configuration item based on the one or more retrieved records, wherein the one or more computer-readable instructions causing the processor to create a previous state of the configuration item include one or more instructions causing the processor to apply the one or more changes from the one or more retrieved records to the one or more current values of the one or more attributes associated with the configuration item to provide one or more previous values of the one or more attributes associated with the configuration item.

8. The tangible computer-readable storage medium of claim 7, wherein the one or more instructions further cause the one or more processors to:

receive configuration data associated with the configuration item;

analyze the received configuration data to determine whether a change has occurred to the one or more values of the one or more attributes associated with the configuration item;

create a record for the configuration item, wherein the created record stores a determined change;
store the created record for the configuration item in the log of records,
wherein the created record is included in the one or more retrieved records associated with the configuration item.

9. The tangible computer-readable storage medium of claim 8, wherein the configuration data associated with the configuration item is received from a discovery agent running on the configuration item.

10. The tangible computer-readable storage medium of claim 7, wherein the one or more search parameters include at least a particular attribute and a particular value for the particular attribute, and wherein the one or more computer-readable instructions causing the one or more processors to:
search the plurality of records to determine a date and time when the particular attribute had the value included in the one or more search parameters; and
retrieve the one or more records associated with the configuration item based on a value of a date attribute and a time attribute associated with the configuration item, wherein the one or more retrieved records include records starting from a current date and time to the previous date and time determined by the search.

11. The tangible computer-readable storage medium of claim 7, wherein the user request further comprises a compare request for a comparison between at least two states of the configuration item, wherein a first state of the at least two states is the current state of the configuration item and a second state of the at least two states is the previous state of the configuration item, and wherein the one or more instructions further cause the one or more processors to:
compare the one or more current values of the one or more attributes associated with the configuration item with the one or more previous values of the one or more attributes associated with the configuration item.

12. The tangible computer-readable storage medium of claim 7, wherein the user request further comprises a compare request for a comparison between at least two states of the configuration item, wherein a first state of the at least two states is a first previous state of the configuration item and a second state of the at least two states is a second previous state of the configuration item, and wherein the one or more instructions further cause the one or more processors to:
retrieve one or more records associated with the configuration item from the log of records based on the one or more search parameters associated with the first previous state, wherein the one or more retrieved records store one or more first changes to one or more values of the one or more attributes associated with the configuration item; and
create a first previous state of the configuration item based on the one or more retrieved records by applying the one or more first changes from the one or more retrieved records to the one or more current values of the one or more attributes associated with the configuration item to provide one or more first previous values of the one or more attributes associated with the configuration item;
retrieve one or more records associated with the configuration item from the log of records based on the one or more search parameters associated with the second previous state, wherein the one or more retrieved records store one or more second changes to one or more values of the one or more attributes associated with the configuration item;
create a second previous state of the configuration item based on the one or more retrieved records by applying the one or more second changes from the one or more retrieved records to the one or more current values of the one or more attributes associated with the configuration item to provide one or more second previous values of the one or more attributes associated with the configuration item; and
compare the one or more first previous values of the one or more attributes associated with the configuration item with the one or more second previous values of the one or more attributes associated with the configuration item.

13. A computer-implemented system for creating a previous state of a configuration item, the system comprising:
one or more processors configured to:
receive a user request for a previous state of a configuration item, wherein the user request includes one or more search parameters, the one or more search parameters including one or more of:
a previous date and time, or
a particular value for a particular attribute;
determine a current state of the configuration item in response to the user request, wherein the current state of the configuration item includes one or more current values of one or more attributes associated with the configuration item;
retrieve one or more records associated with the configuration item from a log of records based on the one or more search parameters in the user request,
wherein the log of records comprises a plurality of records associated with a plurality of configuration items,
wherein the one or more retrieved records of the plurality of records associated with the configuration item store one or more changes to one or more values of the one or more attributes associated with the configuration item,
wherein retrieval of the one or more records associated with the configuration item is based on one or more of a value of a date and time attribute associated with the configuration item or the particular value of the particular attribute associated with the configuration item, and
wherein the one or more retrieved records include one or more of:
records storing changes from between a current date and time and the previous date and time of the user request, or
records storing changes from between a current value of the particular attribute and the particular value in the user request; and
create a previous state of the configuration item based on the one or more retrieved records by applying the one or more changes from the one or more retrieved records to the one or more current values of the one or more attributes associated with the configuration item to provide one or more previous values of the one or more attributes associated with the configuration item.

14. The computer-implemented system of claim 13, wherein the one or more processor are further configured to:
receive configuration data associated with the configuration item;
analyze the received configuration data to determine whether a change has occurred to the one or more values of the one or more attributes associated with the configuration item;

create a record for the configuration item, wherein the created record stores the determined change; and store the created record for the configuration item in the log of records, wherein the created record is included in the one or more retrieved records associated with the configuration item.

15. The computer-implemented system of claim 14, wherein the configuration data associated with the configuration item is received from a discovery agent running on the configuration item.

16. The computer-implemented system of claim 13, wherein the one or more search parameters include at least a particular attribute and a value for the particular attribute, and wherein the one or more processors are further configured to:

search the plurality of records to determine a date and time when the particular attribute had the value included in the one or more search parameters; and retrieve the one or more records associated with the configuration item based on a value of a date attribute and a time attribute associated with the configuration item, wherein the one or more retrieved records include records starting from a current date and time to the previous date and time determined by the search.

17. The computer-implemented system of claim 13, wherein the user request further comprises a compare request for a comparison between at least two states of the configuration item, wherein a first state of the at least two states is the current state of the configuration item and a second state of the at least two states is the previous state of the configuration item, and wherein the one or more processors are further configured to:

compare the one or more current values of the one or more attributes associated with the configuration item with the one or more previous values of the one or more attributes associated with the configuration item.

18. The computer-implemented system of claim 13, wherein the user request further comprises a compare request for a comparison between at least two states of the configuration item, wherein a first state of the at least two states is a first previous state of the configuration item and a second state of the at least two states is a second previous state of the configuration item, and wherein the one or more processors are further configured to:

retrieve one or more records associated with the configuration item from the log of records based on the one or more search parameters associated with the first previous state, wherein the one or more retrieved records store one or more first changes to one or more values of the one or more attributes associated with the configuration item; and create a first previous state of the configuration item based on the one or more retrieved records by applying the one or more first changes from the one or more retrieved records to the one or more current values of the one or more attributes associated with the configuration item to provide one or more first previous values of the one or more attributes associated with the configuration item;

retrieve one or more records associated with the configuration item from the log of records based on the one or more search parameters associated with the second previous state, wherein the one or more retrieved records store one or more second changes to one or more values of the one or more attributes associated with the configuration item;

create a second previous state of the configuration item based on the one or more retrieved records by applying the one or more second changes from the one or more retrieved records to the one or more current values of the one or more attributes associated with the configuration item to provide one or more second previous values of the one or more attributes associated with the configuration item; and compare the one or more first previous values of the one or more attributes associated with the configuration item with the one or more second previous values of the one or more attributes associated with the configuration item.

19. A computer-implemented method for creating a previous state of a configuration item, the method executed by one or more processors configured to perform a plurality of operations, the operations comprising:

determining a current state of the configuration item in response to a user request, wherein the current state of the configuration item includes one or more current values of one or more attributes associated with the configuration item, retrieving, from a log of records, one or more records associated with a previous state of the configuration item based on one or more search parameters of the user request, wherein the log of records comprises a plurality of records associated with a plurality of configuration items, and wherein the one or more retrieved records store one or more changes to one or more values of the one or more attributes associated with the configuration item;

creating the previous state of the configuration item based on the one or more retrieved records by applying the one or more changes from the one or more retrieved records to the one or more current values of the one or more attributes associated with the configuration item to provide the one or more one or more previous values of the one or more attributes associated with the configuration item; and comparing the one or more current values of the one or more attributes associated with the configuration item with the one or more previous values of the one or more attributes associated with the configuration item.

20. A non-transitory, tangible computer-readable storage medium having one or more computer-readable instructions thereon which when executed by one or more processors cause the one or more processors to:

determine a current state of the configuration item in response to a user request, wherein the current state of the configuration item includes one or more current values of one or more attributes associated with the configuration item, retrieve, from a log of records, one or more records associated with a previous state of the configuration item based on one or more search parameters of the user request, wherein the log of records comprises a plurality of records associated with a plurality of configuration items, and wherein the one or more retrieved records store one or more changes to one or more values of the one or more attributes associated with the configuration item;

create the previous state of the configuration item based on the one or more retrieved records by applying the one or more changes from the one or more retrieved records to the one or more current values of the one or more attributes associated with the configuration item to provide the one or more one or more previous values of the one or more attributes associated with the configuration item; and compare the one or more current values of the one or more attributes associated with the configuration item with the one or more previous values of the one or more attributes associated with the configuration item.

21. A computer-implemented system for creating a previous state of a configuration item, the system comprising:
one or more processors configured to:
determine a current state of the configuration item in response to a user request, wherein the current state of the configuration item includes one or more current values of one or more attributes associated with the configuration item,
retrieve, from a log of records, one or more records associated with a previous state of the configuration item based on one or more search parameters of the user request, wherein the log of records comprises a plurality of records associated with a plurality of configuration items, and wherein the one or more retrieved records store one or more changes to one or more values of the one or more attributes associated with the configuration item;
create the previous state of the configuration item based on the one or more retrieved records by applying the one or more changes from the one or more retrieved records to the one or more current values of the one or more attributes associated with the configuration item to provide the one or more one or more previous values of the one or more attributes associated with the configuration item; and
compare the one or more current values of the one or more attributes associated with the configuration item with the one or more previous values of the one or more attributes associated with the configuration item.

* * * * *

UNITED STATES PATENT AND TRADEMARK OFFICE
CERTIFICATE OF CORRECTION

| | | |
|---|---|---|
| PATENT NO. | : 8,447,737 B2 | Page 1 of 1 |
| APPLICATION NO. | : 12/549829 | |
| DATED | : May 21, 2013 | |
| INVENTOR(S) | : Peter McKay | |

It is certified that error appears in the above-identified patent and that said Letters Patent is hereby corrected as shown below:

In the Claims

Column 22, line 9 (claim 21, line 23) please change "one or more one or more" to -- one or more --

Signed and Sealed this
Twenty-fourth Day of June, 2014

Michelle K. Lee
*Deputy Director of the United States Patent and Trademark Office*